United States Patent

Rademacher-Dubbick

Patent Number: 5,804,742
Date of Patent: Sep. 8, 1998

[54] MASS FLOW METER

[75] Inventor: Kristian Rademacher-Dubbick, Duisburg, Germany

[73] Assignee: Krohne AG, Basel, Switzerland

[21] Appl. No.: 810,466

[22] Filed: Mar. 4, 1997

Related U.S. Application Data

[63] Continuation of Ser. No. 497,198, Jun. 30, 1995, abandoned.

[30] Foreign Application Priority Data

Jul. 4, 1994 [DE] Germany ............... 44 23 168.7

[51] Int. Cl.$^6$ ............................................. G01F 1/84
[52] U.S. Cl. ............................................. 73/861.357
[58] Field of Search ................. 73/861.354, 861.355, 73/861.356, 861.357

[56] References Cited

U.S. PATENT DOCUMENTS

| | | | |
|---|---|---|---|
| 4,311,054 | 1/1982 | Cox et al. | 73/861.356 |
| 5,321,991 | 6/1994 | Kalotay | 73/861.357 |
| 5,323,658 | 6/1994 | Yao et al. | 73/861.355 |
| 5,398,554 | 3/1995 | Ogawa et al. | 73/861.355 |

Primary Examiner—George M. Dombroske
Assistant Examiner—Harshad Patel
Attorney, Agent, or Firm—Cesari and McKenna, LLP

[57] ABSTRACT

The invention concerns a mass flow meter for flowing media that works on the Coriolis Principle, with at least one Coriolis line carrying the flowing medium, at least one oscillator exciting the Coriolis line, at least two transducers detecting Coriolis vibrations based on Coriolis forces and a control unit controlling the oscillator and evaluating the measurement signals from the transducers, wherein the oscillator excites the Coriolis line with an excitation power and wherein a generator is provided that supplies the excitation power to the oscillator. The mass flow meter is characterized by the fact that the excitation power of the generator can be adjusted during operation, so that the amplitudes of the excitation oscillation of the Coriolis line can be adjusted to the most optimal value possible.

18 Claims, 1 Drawing Sheet

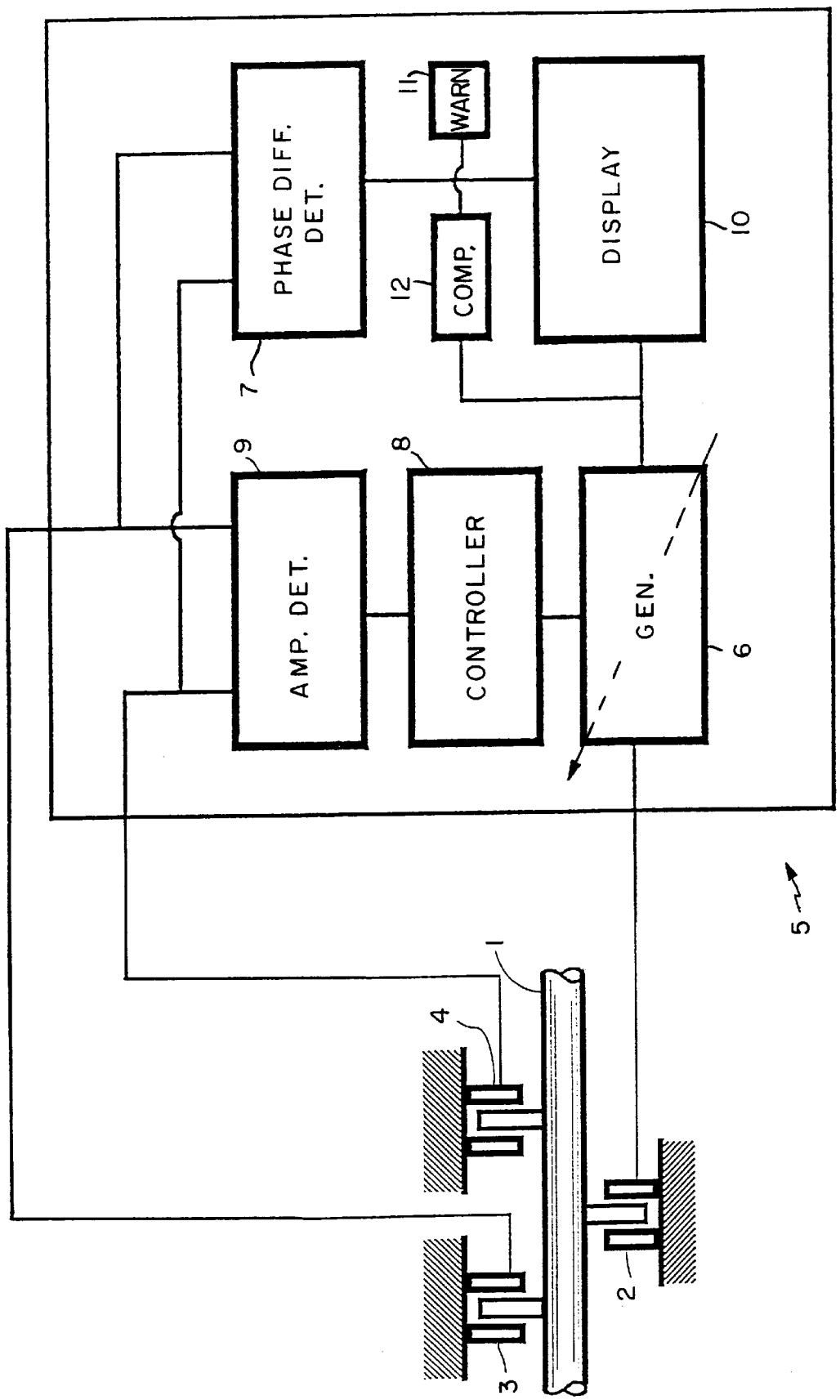

MASS FLOW METER

RELATED APPLICATION

This application is a continuation of Ser. No. 08/497,198, filed Jun. 30, 1995, now abandoned.

The invention concerns a mass flow meter for flowing media that works on the Coriolis Principle, with at least one Coriolis line carrying the flowing medium, at least one oscillator exciting the Coriolis line, at least two transducers detecting Coriolis oscillations based on Coriolis forces and one control unit controlling the oscillator and evaluating the measurement signals of the transducer, wherein the oscillator excites the Coriolis line with an excitation power and wherein an excitation generator supplying the excitation power to the oscillator is provided.

BACKGROUND OF THE INVENTION

Mass flow meters for flowing media that work on the Coriolis Principle are known in various embodiments and are being used to an increasing extent.

One significant variable that is the same for all known mass flow meters is the amplitude of the excitation oscillation of the Coriolis line. In contrast to the frequency of the excitation oscillation of the Coriolis line, this amplitude does not enter into the first order in the measurement result for the mass flow by the mass flow meter, but into a higher order, caused by nonlinear effects in the deformation of the Coriolis line during the excitation oscillation. These higher-order effects are especially important to the precision required today of a relative measurement accuracy smaller than 0.1% with a mass flow value of 10% to 100% of the nominal flow for mass flow meters that work on the Coriolis principle.

The amplitude of the excitation oscillation of the Coriolis line is dependent on plurality of factors. They are, first of all, the properties of the system capable of vibrating in the form of the Coriolis line, its direct surroundings and the contents of the Coriolis line, hence the flowing medium, per se, and secondly, the excitation power supplied to the Coriolis line by the oscillator, and lastly the coupling of the oscillating system to the outer environment, hence to the surrounding system of pipes. Of these influencing factors, the first two are relatively simple to control, since they are predetermined or known. The coupling of the oscillating system's "mass flow meter" to the surrounding system of pipes is, first of all, not known in advance, and secondly is almost incapable of being predetermined. The decisive factors influencing this coupling are, for example, the diameter and wall strength of the adjacent pipelines and the distance between the connection of the mass flow meter to the adjacent pipeline and the next supporting points of the adjacent pipelines. Depending on how the Coriolis line of the mass flow meter is coupled to the adjacent pipelines, a great deal of the excitation power exerted on the Coriolis line for the excitation oscillation is lost and disappears in the adjacent pipeline system.

To guarantee that the mass flow meter is sufficiently precise, the amplitude of the excitation oscillation of the Coriolis line must not fall short of a minimum amplitude, since otherwise the transducer no longer supplies signals that can be analyzed. To guarantee this minimum amplitude of the excitation oscillation of the Coriolis line in the overwhelming number of ways of mounting the mass flow meter in a pipeline system, the excitation power predetermined during the process of producing the known flow meters is relatively large, so that on one hand, under optimal mounting conditions, the amplitude of the excitation oscillation of the Coriolis line is clearly above the minimum amplitude, but on the other hand, when the mounting of the mass flow meter is not optimal, sufficient amplitude of the excitation vibration of the Coriolis line is guaranteed. Here the problem is that the greater the amplitude of the excitation oscillation of the Coriolis line, the more higher-order sources of error are present.

The problem solved by the invention is, therefor, based on designing and developing the known mass flow meter so that the amplitude of the excitation oscillation of the Coriolis line measured on the environmental factors always assumes as optimal a value as possible.

SUMMARY OF THE INVENTION

The mass flow meter of the invention, in which the problem presented above is solved, is characterized by the fact that the excitation power of the generator supplying the excitation power can be adjusted during operation. The measure in the invention guarantees that regardless of the process for producing the mass flow meter, during the operation of the mass flow meter, an optimal value for the amplitude of the excitation oscillation of the Coriolis line can be obtained manually or automatically. For example, when the mass flow meter is mounted in the optimal position within a pipeline system, it can be guaranteed that the amplitude of the excitation oscillation of the Coriolis line actually corresponds only to the minimum amplitude necessary for optimal operation of the transducer. This guarantees that the higher-order measurement errors that occur at a high amplitude of the excitation oscillation of the Coriolis line are minimized and thus precision is clearly increased when the mass flow is determined.

There are many ways of designing and developing the mass flow meter of the invention. For this, please refer, on one hand, to the patent claims and, on the other hand, to the description of an embodiment of the invention with the accompanying drawing.

BRIEF DESCRIPTION OF THE DRAWING

For a fuller understanding of the nature and objects of the invention, reference should be had to the following detailed description taken in connection with the accompanying schematic drawing of a preferred embodiment of a mass flow meter according to the invention.

DESCRIPTION OF THE PREFERRED EMBODIMENT

The drawing figure is a schematic representation of a preferred embodiment of a mass flow meter for flowing media that works on the Coriolis Principle. This mass flow meter has a Coriolis line 1 conveying the flowing medium, an oscillator 2 exciting the Coriolis line 1, two transducers 3,4 detecting Coriolis oscillations based on Coriolis forces and a control unit 5 that controls the oscillator 2 and evaluates the measurement signals of the transducers 3,4. Here it should be noted that it is conceivable to dispense with one of the transducers 3,4 and instead of the signals from said one transducer 3 or 4, transmit the signals from the oscillator 2 to the control unit 5 for evaluation. In the mass flow meter in the invention, the oscillator 2 excites the Coriolis line 1 with an excitation power, wherein there is a generator 6 in the control unit 5 that supplies the excitation power to the oscillator 2. As with the known mass flow meters, the measured signals of the transducers 3, 4 are fed to a phase-difference detector 7 in the control unit 5, which determines the phase difference between the measured signals from the transducers 3, 4 in proportion to the mass flow through the Coriolis line 1.

According to the invention, the mass flow meter is characterized by the fact that the excitation power of the generator 6 can be adjusted during operation of the flow meter.

According to a first alternative, the mass flow meter of the invention is designed so that the excitation power of the generator 6 can be adjusted by an operator via an activating or control element accessed from the outside as shown by the phantom arrow. This guarantees that an operator, using the activating element accessed from the outside, can raise the excitation power until the mass flow meter supplies reproducible values or, during a calibration process, supplies the corresponding measured value for a predetermined mass flow. This guarantees that the excitation oscillation of the Coriolis line 1 does not have an unnecessarily high amplitude.

One especially preferred flow meter embodiment shown in the drawing figure incorporates a control unit 5 which has a controller 8 that keeps the amplitude of the excitation oscillation as a control variable at a desired value and influences the excitation power of the generator 6 as a correcting variable of the control circuit. This guarantees a constant amplitude of the excitation oscillation of the Coriolis line 1 regardless of all potential factors. If the desired value for the amplitude of the excitation oscillation of the Coriolis line 1 corresponds to the minimum amplitude to be evaluated optimally by the transducers 3, 4, this guarantees that the measurement precision for the mass flow is constantly high.

Another design variant is the example of the embodiment shown of a mass flow meter according to the invention wherein the average of the amplitude of the measurement signals detected by an amplitude detector 9 is fed to the controller 8 as an actual value. Feeding the average of the amplitudes of the measured signals to the controller 8 as an actual value increases the accuracy of the measurement.

As an alternative to the design described above of the preferred embodiment, there is a version wherein the sum of the amplitude of the measured signals is fed to the controller 8 as an actual value. This is a simplification over the previous design, since the amplitudes of the measured signals do not have to be determined independently of one another and then the mean taken, but rather the amplitude of the measured signals added together only has to be found once.

Alternatively, the amplitude of at least one measured signal can be determined directly from the measured signal itself, i.e., by comparing the measured signals at various points in time, or indirectly from an average of the measured signal over time. The last alternative for finding the amplitude of the measured signal can be used, for example, by integrating the absolute value of any measured signal in a predetermined interval of time.

Since in the preferred embodiment, the generator 6 does not have to supply excitation power to the oscillator 2 continually, the mass flow meter of the invention is preferably designed so that the controller 8 influences the average of the excitation power supplied by the excitation generator 6 over time.

One especially preferred design is the embodiment shown in the figure of a mass flow meter according to the invention wherein the excitation generator 6 supplies conventionally produced pulse-width-controlled power pulses to the oscillator 2. This guarantees that the influence of the excitation power is very simple.

Another especially advantageous design is an embodiment of a mass flow meter according to the invention wherein there is a display element 10 that displays the excitation power as a measure for the installation quality of the mass flow meter. Both in the case of manual adjustment of the excitation power of the generator 6 by an operator and also in the case of automatic control of the amplitude of the excitation oscillation, the excitation power necessary for highly precise operation of the mass flow meter is a measurement of the installation quality: if the excitation power is relative low for example, so the coupling of the mass flow meter to the surrounding system of pipes is also low. Displaying the excitation power necessary for highly precise operation has a special advantage, because the coupling of the mass flow meter to the surrounding system of pipes in known mass flow meters influences the amplitude of the excitation oscillation of the Coriolis line 1, and because a higher coupling is also responsible for a higher scatter of oscillations present in the adjacent pipeline system into the mass flow meter, and this scatter can substantially influence the measurements of the phase difference between the measurement signals of the transducers 3,4.

Thus, if the display element 10 shows a high excitation power, this is an indication to the operator that the installation should be optimized in order to maintain a measurement precision that complies with the specifications for the mass flow meter. In the preferred embodiment shown in the figure, the display element 10 is used for displaying the mass flow, which comes from the phase difference determined in the phase-difference detector 7, besides showing the excitation power. Of course, a separate display element can also be provided to show the excitation power.

In conclusion, the preferred embodiment shown of a mass flow meter according to the invention can be improved by providing a threshold comparator 12 that gives a warning signal via a warning display element 11 when a predetermined maximum excitation power is exceeded in the control unit 5. This threshold comparator 12 and warning display element 11 signal the operator that the excitation power is in a range that shows that the installation of the mass flow meter should be optimized. The warning display element 11 can, of course, alternatively be built into the display element 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. A method of measuring the mass flow of a flowing medium in a Coriolis line comprising the steps of:

installing the Coriolis line in a pipeline system having certain initial environmental conditions;

exciting the Coriolis line with a measured excitation power;

adjusting the excitation power so that the Coriolis line vibrates with a predetermined vibration amplitude;

displaying the excitation power during operation of the flow meter, and using the displayed excitation power value as a measure for the installation quality of the mass flow meter to minimize the coupling of vibrations between the Coriolis line and the pipeline system in which it is installed.

2. The method defined in claim 1 including the step of changing one or more of said parameters to minimize the displayed excitation power value and thereby optimize the mass flow measurement.

3. The method defined in claim 1 including the step of providing a warning signal when the displayed excitation power value exceeds a predetermined maximum value.

4. The method defined in claim 1 wherein said adjusting is done manually.

5. The method defined in claim 1 wherein said adjusting is done automatically while maintaining the predetermined vibration amplitude constant during operation of the flow meter.

6. A method of measuring mass flow of a flowing medium using a mass flow meter of the type that works on the Coriolis principle and includes at least one Coriolis line carrying the flowing medium, at least one oscillator exciting the Coriolis line, at least two transducers detecting Coriolis vibrations based on Coriolis forces and a control unit controlling the oscillator and evaluating the measurement signals of the transducers and wherein the oscillator excites the Coriolis line with an excitation power and wherein a generator supplies adjustable excitation power to the oscillator during operation of the flow meter, said method including the steps of installing the Coriolis line in a pipeline system having certain initial environmental conditions;

measuring and displaying the excitation power during operation of the flow meter, and using the displayed excitation power value as a measure for the installation quality of the mass flow meter to minimize the coupling of vibrations between the Coriolis line and the pipeline system in which it is installed.

7. The method defined in claim 6 including the step of adjusting the exciting of the Coriolis line so that the Coriolis line vibrates with a predetermined vibration amplitude.

8. The method defined in claim 7 including the step of changing one or more of said parameters to minimize the displayed excitation power value.

9. The method defined in claim 7 including the step of providing a warning signal if the displayed excitation power value exceeds a predetermined maximum value.

10. The method defined in claim 6 including the step of, while holding the amplitude of the excitation oscillation at a desired value, influencing the excitation power of the generator as a correcting variable for the flow meter.

11. A mass flow meter for a flowing medium that works on the Coriolis Principle, said flow meter having an installation quality and comprising at least one Coriolis line carrying the flowing medium;

at least one oscillator exciting the Coriolis line into vibration upon receiving excitation power;

a generator supplying adjustable excitation power to the oscillator;

at least two transducers detecting Coriolis vibrations based on Coriolis forces and producing measurement signals indicative thereof;

means for evaluating said measurement signals;

means for measuring and displaying the excitation power during operation of the flow meter so that the displayed excitation power value can be used as a measure for the installation quality of the mass flow meter in order to minimize coupling of vibrations between the Coriolis line and a pipeline system.

12. A mass flow meter for flowing media that works on the Coriolis Principle and has an installation quality, with at least one Coriolis line carrying the flowing medium, at least one oscillator exciting the Coriolis line, at least two transducers detecting Coriolis vibrations based on Coriolis forces and a control unit controlling the oscillator and evaluating the measurement signals of the transducers wherein the oscillator excites the Coriolis line with an excitation power and wherein a generator supplies adjustable excitation power to the oscillator during operation of the flow meter, characterized by the fact that the flow meter includes a display element that displays the measured excitation power as a measure for the installation quality of the mass flow meter.

13. The mass flow meter according to claim 12, characterized by the fact that in the control unit, there is a controller holding the amplitude of the excitation oscillation as a control variable at a desired value, and the controller influences the excitation power of the generator as a correcting variable of the control circuit.

14. The mass flow meter according to claim 13, characterized by the fact that the average of the amplitudes of the measured signals is fed to the controller as an actual value.

15. The mass flow meter according to claim 13, characterized by the fact that the sum of the amplitudes of the measured signals is fed to the controller as an actual value.

16. The mass flow meter according to any one of claims 13 to 15, characterized by the fact that the controller influences the average over time of the excitation power supplied by the generator.

17. The mass flow meter according to claim 16, characterized by the fact that the generator supplies pulse-width-controlled power pulses to the oscillator.

18. The mass flow meter according to any one of claims 12 to 15 characterized by the fact that the control unit has a threshold comparator that gives a warning signal via a warning-display element when a predetermined maximum excitation power is exceeded.

\* \* \* \* \*